United States Patent
Mayumi et al.

(10) Patent No.: US 9,536,440 B2
(45) Date of Patent: Jan. 3, 2017

(54) QUESTION SETTING APPARATUS AND METHOD

(71) Applicant: FUJITSU LIMITED, Kawasaki-shi, Kanagawa (JP)

(72) Inventors: Hidehiko Mayumi, Kawasaki (JP); Toshio Tanaka, Yokohama (JP); Takeaki Kobayashi, Yokohama (JP); Masahiro Kawasaki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/022,851

(22) Filed: Sep. 10, 2013

(65) Prior Publication Data

US 2014/0011176 A1    Jan. 9, 2014

Related U.S. Application Data

(63) Continuation of application No. PCT/JP2011/056636, filed on Mar. 18, 2011.

(51) Int. Cl.
*G09B 3/00* (2006.01)
*G09B 7/00* (2006.01)
*G09B 5/14* (2006.01)
*G09B 7/04* (2006.01)

(52) U.S. Cl.
CPC . *G09B 7/00* (2013.01); *G09B 5/14* (2013.01); *G09B 7/04* (2013.01)

(58) Field of Classification Search
CPC .................................................. G09B 7/00
USPC ........................................ 434/322, 323, 350
See application file for complete search history.

(56) References Cited

FOREIGN PATENT DOCUMENTS

| JP | 1-245384 | 9/1989 |
|---|---|---|
| JP | 7-210074 | 8/1995 |
| JP | 2005-70465 | 3/2005 |
| JP | 2005-115344 | 4/2005 |
| JP | 2007-248773 | 9/2007 |
| JP | 2010-256745 | 11/2010 |
| WO | WO 03/050782 | 6/2003 |

OTHER PUBLICATIONS

WO 03/050782 English translation Jan. 8, 2015.*
JP 2007-248773 English translation Jan. 8, 2015.*

(Continued)

*Primary Examiner* — Kesha Frisby
(74) *Attorney, Agent, or Firm* — Staas & Halsey LLP

(57) ABSTRACT

A question setting apparatus is disclosed, including a processor and a storage part. The storage part stores a problem database which maintains problem data including a problem and a correct answer and a student answer database which maintains answer data including an answer of a student for the problem and a correct/incorrect answer determination result for each of the students. The processor performs recording the answer data and the correct/incorrect answer determination result by using the problem database based on a correct answer of the problem, the answer data being received during a test from each of student terminals connected through a network; and sending a comment to the student terminals through the network in which during the test, an answer state of the students is determined by using the student answer database and the comment related to the problem is acquired from a teacher based on a determination result.

7 Claims, 20 Drawing Sheets

(56) References Cited

OTHER PUBLICATIONS

International Search Report mailed May 10, 2011 in corresponding International Application No. PCT/JP2011/056636.
Patent Abstracts of Japan, Publication No. 01-245384, Published Sep. 29, 1989.
Patent Abstracts of Japan, Publication No. 07-210074, Published Aug. 11, 1995.
Patent Abstracts of Japan, Publication No. 2005-070465, Published Mar. 17, 2005.
Patent Abstracts of Japan, Publication No. 2005-115344, Published Apr. 28, 2005.
Patent Abstracts of Japan, Publication No. 2007-248773, Published Sep. 27, 2007.
Patent Abstracts of Japan, Publication No. 2010-256745, Published Nov. 11, 2010.

* cited by examiner

FIG.4

31 STUDENT DB

| STUDENT ID | PASSWORD | STUDENT NAME |
|---|---|---|
| 201001001 | sjhgpeut87 | TARO AOKI |
| 201001002 | Kuu862nkk | JIRO AOSHIMA |
| 201001003 | 984nfkihb | SABURO AOTA |
| 201001004 | k3754h5nkl | ICHIRO AOYAMA |
| | | |

FIG.5

32 PROBLEM DB

| PROBLEM ID | PROBLEM TEXT | OPTION_1 | OPTION_2 | OPTION_3 | OPTION_4 | CORRECT ANSWER |
|---|---|---|---|---|---|---|
| 10111 | WHAT GENERATION OF GENERAL WAS IEMITSU TOKUGAWA ? | 3RD | 8TH | 4TH | 15TH | 1 |
| 10112 | WHO WAS ASSASSINATED IN AN INCIDENT AT THE HONNOJI TEMPLE ? | NOBUNAGA ODA | IEYASU TOKUGAWA | HIDEYOSHI TOYOTOMI | MITSUNARI ISHIDA | 1 |
| 10113 | WHO WAS SUSPECTED OF REBELLING IN AN INCIDENT AT THE HONNOJI TEMPLE ? | MITUNARI ISHIDA | NOBUNAGA ODA | HIDEYOSHI TOYOTOMI | MITUHIDE AKECHI | 4 |
| 10114 | IN WHICH YEAR DID THE KAMAKURA SHOGUNATE BEGIN ? | YEAR 1125 | YEAR 1190 | YEAR 1192 | YEAR 1292 | 3 |
| 10115 | IN WHICH BATTLE DID SHINGEN TAKEDA AND IEYASU TOKUGAWA FIGHT ? | BATTLE OF MIKATAGAHARA | BATTLE OF KAWANAKAJIMA | SUMMER CAMPAIGN OF THE SIEGE OF OSAKA | BATTLE OF SEKIGAHARA | 3 |

FIG.6

33 STUDENT ANSWER DB

| STUDENT ID | PROBLEM ID | ANSWER | CORRECT /INCORRECT ANSWER | ANSWER TIME (MIN) |
|---|---|---|---|---|
| 201001001 | 10111 | 1 | ○ | 1 |
| | 10112 | 4 | × | 2 |
| | 10113 | 1 | × | 1 |
| | 10114 | 1 | × | 2 |
| | 10115 | 3 | ○ | 3 |
| 201001002 | 10111 | 3 | × | 4 |
| | 10112 | 4 | × | 6 |
| | 10113 | 1 | × | 1 |
| | 10114 | 2 | ○ | 1 |
| | 10115 | 3 | ○ | 2 |

FIG.7

34 DETERMINATION DB

| ANSWER PERCENTAGE | CORRECT ANSWER PERCENTAGE | ANSWER TIME | STUDENT PERCENTAGE |
|---|---|---|---|
| 30% | 20% | MORE THAN OR EQUAL TO 5 MIN | 40% |

FIG.8

35 COMMENT DB

| PROBLEM ID | PROBLEM TEXT | TEACHER COMMENT |
|---|---|---|
| 10111 | WHAT GENERATION OF GENERAL WAS IEMITSU TOKUGAWA ? | THINK ABOUT WHOSE CHILD IEMITSU WAS. |
| 10112 | WHO WAS ASSASSINATED IN AN INCIDENT AT THE HONNOJI TEMPLE ? | NO COMMENT. |
| 10113 | WHO WAS SUSPECTED OF REBELLING IN AN INCIDENT AT THE HONNOJI TEMPLE ? | HE WAS A FEUDATORY OF AN ASSASSINATED PERSON. |
| 10115 | IN WHICH BATTLE DID SHINGEN TAKEDA AND IEYASU TOKUGAWA FIGHT ? | IT WAS A BATTLE WHEN IEYASU WAS YOUNGER. |

FIG.9

61 RECEIVED PROBLEM TABLE

| PROBLEM ID | PROBLEM TEXT | OPTION_1 | OPTION_2 | OPTION_3 | OPTION_4 | CORRECT ANSWER |
|---|---|---|---|---|---|---|
| 10111 | WHAT GENERATION OF GENERAL WAS IEMITSU TOKUGAWA ? | 3RD | 8TH | 4TH | 15TH | 1 |
| 10112 | WHO WAS ASSASSINATED IN AN INCIDENT AT THE HONNOJI TEMPLE ? | NOBUNAGA ODA | IEYASU TOKUGAWA | HIDEYOSHI TOYOTOMI | MITSUNARI ISHIDA | 1 |
| 10113 | WHO WAS SUSPECTED OF REBELLING IN AN INCIDENT AT THE HONNOJI TEMPLE ? | MITUNARI ISHIDA | NOBUNAGA ODA | HIDEYOSHI TOYOTOMI | MITUHIDE AKECHI | 4 |
| 10114 | IN WHICH YEAR DID THE KAMAKURA SHOGUNATE BEGIN ? | YEAR 1125 | YEAR 1190 | YEAR 1192 | YEAR 1292 | 3 |
| 10115 | IN WHICH BATTLE DID SHINGEN TAKEDA AND IEYASU TOKUGAWA FIGHT ? | BATTLE OF MIKATAGAHARA | BATTLE OF KAWANAKAJIMA | SUMMER CAMPAIGN OF THE SIEGE OF OSAKA | BATTLE OF SEKIGAHARA | 3 |

FIG.10

62 ANSWER TABLE

| PROBLEM ID | ANSWER | ANSWER TIME (MIN) | CORRECT/INCORRECT ANSWER |
|---|---|---|---|
| 11 | 2 | 4 | × |
| 12 | 3 | 1 | × |
| 13 | 4 | 5 | × |
| 14 | 3 | 1 | ○ |
| 15 |  | 1 |  |

FIG.11

63 RECEIVED COMMENT DB

| PROBLEM ID | PROBLEM TEXT | TEACHER COMMENT |
|---|---|---|
| 10111 | WHAT GENERATION OF GENERAL WAS IEMITSU TOKUGAWA ? | THINK ABOUT WHOSE CHILD IEMITSU WAS. |
| 10112 | WHO WAS ASSASSINATED IN AN INCIDENT AT THE HONNOJI TEMPLE ? | NO COMMENT. |
| 10113 | WHO WAS SUSPECTED OF REBELLING IN AN INCIDENT AT THE HONNOJI TEMPLE ? | HE WAS A FEUDATORY OF AN ASSASSINATED PERSON. |
| 10115 | IN WHICH BATTLE DID SHINGEN TAKEDA AND IEYASU TOKUGAWA FIGHT ? | IT WAS A BATTLE WHEN IEYASU WAS YOUNGER. |

FIG.18

COMMENT REQUEST SCREEN

PROBLEM ID 10113 ~150a

WHO WAS SUSPECTED OF REBELLING IN AN INCIDENT AT THE ~150b
HONNNOJI TEMPLE ?
○MITSUNARI ISHIDA  ○NOBUNAGA ODA  ○HIDEYOSI TOYOTOMI  ~150c
○MITUHIDE AKECHI

| STUDENT ID | PROBLEM ID | ANSWER | CORRECT /INCORRECT ANSWER | ANSWER TIME (MIN) |
|---|---|---|---|---|
| 201001001 | 10113 | 1 | × | 1 |
| 201001002 | 10113 | 1 | × | 1 |
| 201001003 | 10113 | 3 | × | 4 |
| 201001004 | 10113 | 2 | × | 3 |

COMMENT INPUT FIELD  ~150e

150f~ [ SEND COMMENT ]   [ DO NOT SEND COMMENT ] ~150g

FIG.20

TEACHER SENT YOU COMMENTS FOR PROBLEMS BELOW. ⎱ 270a
PLEASE REVIEW YOUR ANSWER.                      ⎰

270 COMMENT DISPLAY SCREEN

| PROBLEM ID | YOUR ANSWER | PROBLEM TEXT | TEACHER COMMENT | REVIED ANSWER INPUT WE FIELD 270b |
|---|---|---|---|---|
| 10111 | 2 (8TH GENERATION) | WHAT GENERATION OF GENERAL WAS IEMITSU TOKUGAWA ? | THINK ABOUT WHOSE CHILDREN IEMITSU IS | ☐1 3RD<br>☐3 4TH<br>☐4 15TH |
| 10113 | 3 (HIDEYOSHI TOYOTOMI) | WHO WAS SUSPECTED OF REBELLING IN AN INCIDENT AT THE HONNOJI TEMPLE ? | PROBABLY LEAD YOU TO CORRECT ANSWER, IF YOU RECALL A PERSON WHO APPEARS IN WESTERN JAPAN TO ASSASSINATE MOURI | ☐1 NOBUNAGA ODA<br>■2 IEYASU TOKUGAWA<br>☐4 MITSUNARI ISHIDA |
| 10115 | 4 (BATTLE OF SEKIGAHARA) | IN WHICH BATTLE DID SHINGEN TAKEDA AND IEYASU TOKUGAWA FIGHT ? | IT WAS A BATTLE WHEN IEYASU WAS YOUNGER | ☐1 BATTLE OF MIKATAGAHARA<br>☐2 BATTLE OF KAWANAKAJIMA<br>☐3 SUMMER CAMPAIGN OF THE SIEGE OF OSAKA |

[SEND] 270c    [CLEAR] 270d    [BACK] 270e

QUESTION SETTING APPARATUS AND METHOD

CROSS-REFERENCE TO RELATED APPLICATION

This application is a continuation of International Application PCT/JP2011/056636 filed on Mar. 18, 2011 and designated the U.S., the entire contents of which are incorporated herein by reference.

FIELD

The present invention is related to a question setting apparatus and method for sending a problem to student terminals and collecting answers of students from the student terminals through a network.

BACKGROUND

Recently, in Japan, information terminals have been installed and a empirical experiment has begun at public elementary schools. All elementary and junior high schools are scheduled to distribute digital textbooks. In the future, it is considered possible for a next generation education system using mobile information terminals to pervade nationwide. Conventionally, it is possible to send a problem to a learner and to present a next problem in response to the ability of the learner based on a mark result, through a network.

As a learning system, a technology is known in which an answer result of a learner is received, and patterns of incorrectly answered problems, and other problems which took more than a standard time to acquire a correct answer, are viewable as a learning result, so that a teacher and parents are able to recognize a weak point of the learner.

A technology is presented to acquire and output solution information, which is created beforehand for each of problems, from a storage part, after an end of a test, for the problems in which correct answers were not obtained. A technology is also presented to acquire a reason for an incorrect answer from a student from whom a mark result is received, and to provide the reason for the incorrect answer created by the student when another student also answers the same problem incorrectly.

PATENT DOCUMENTS

Patent Document 1: Japanese Laid-open Patent Publication No. 2005-070465
Patent Document 2: Japanese Laid-open Patent Publication No. 2010-256745
Patent Document 3: Japanese Laid-open Patent Publication No. 2005-115344

SUMMARY

According to one aspect of an embodiment, there is provided a question setting apparatus, including a processor; and a storage part; wherein the storage part stores a problem database which maintains problem data including a problem and a correct answer; and a student answer database which maintains answer data including an answer of a student for the problem and a correct/incorrect answer determination result for each of the students, and the processor performs recording the answer data and the correct/incorrect answer determination result by using the problem database based on a correct answer of the problem, the answer data being received during a test from each of multiple student terminals connected through a network; and sending a comment to the multiple student terminals through the network in which during the test, an answer state of the students is determined by using the student answer database and the comment related to the problem is acquired from a teacher based on a determination result.

According to other aspects of the embodiment, there may be provided a question setting method, and a non-transitory computer-readable recording medium to cause a computer to function as the above described apparatus.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

BRIEF DESCRIPTION OF DRAWINGS

FIG. 4 is a diagram illustrating a data configuration example of a student DB of the teacher terminal;

FIG. 5 is a diagram illustrating a data configuration example of a problem DB of the teacher terminal;

FIG. 6 is a diagram illustrating a data configuration example of a student answer DB of the teacher terminal;

FIG. 7 is a diagram illustrating a data configuration example of a determination DB of the teacher terminal;

FIG. 8 is a diagram illustrating a data configuration example of a comment DB of the teacher terminal;

FIG. 9 is a diagram illustrating a data configuration example of a received problem table of the student terminal;

FIG. 10 is a diagram illustrating a data configuration example of an answer table of the student terminal;

FIG. 11 is a diagram illustrating a data configuration example of a received comment DB of the student terminal;

FIG. 18 is a diagram illustrating an example of a comment request screen displayed at the teacher terminal;

FIG. 20 is a diagram illustrating an example of a comment display screen displayed at the student terminal.

DESCRIPTION OF EMBODIMENT

By using the related art, it becomes possible to determine an ability of a learner and to provide information so that the learner is able to understand a problem for which the learner incorrectly answered, based on a test result after an end of the test. In the related art, the information is provided after the end of the test.

However, there are various types of tests including a test which is not formal or real. Informal tests may include a test such as a drill (so-called exercise) which is given daily to students in a class. In this case, instead of expecting a high correct answer percentage of the students, it is emphasized to let the student understand a learning content in a process of answering the problem. Accordingly, even in the middle of the test, it is preferable to see a situation of the students answering the problem and to give the students advice on how to answer the problem from a teacher.

The teacher needs to determine whether a reason why the students incorrectly answer and a reason why the students take time to answer are lack of comprehension by the students or nonconformity between a class content and the problem content because of an insufficient explanation in a class. The teacher needs to change a responding method depending on the reason. If the reason is lack of comprehension of the students, it may be preferable that the teacher let the students spend the entire test time to obtain an answer. On the other hand, if the reason is the insufficient explanation in the class, it may be preferable that the teacher follows up the insufficient explanation to the students as early as possible.

However, in the above described related art, it is difficult for the teacher to comprehend an answer state of the students during the test. Also, it is difficult for the teacher to appropriately explain the problem depending on the answer state of the students during the test.

In the following, an embodiment of the present invention will be described with reference to the accompanying drawings. In a system according to the embodiment, regarding a problem (a drill or the like) to confirm the comprehension of the class content of the students performed within time of each class, it is possible to support the teacher during the test to comprehend a state which is considered as being caused by the insufficient explanation of the teacher at a class, and to promptly explain the problem at that instant.

Figure 1:
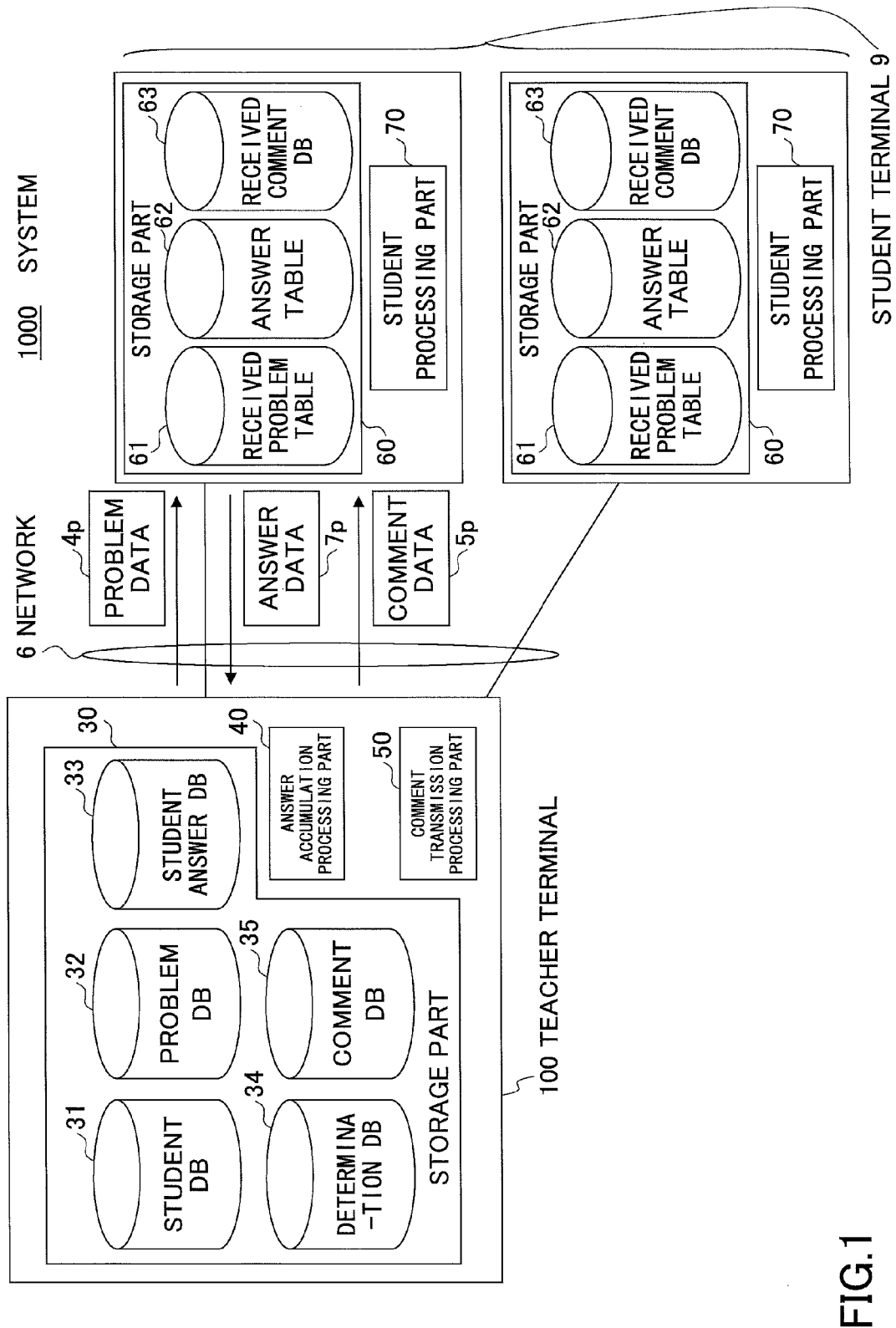
FIG. 1 is a diagram illustrating a system configuration example according to an embodiment.

FIG. 1 is a diagram illustrating a system configuration example according to the embodiment. A system 1000 illustrated in FIG. 1 includes a teacher terminal 100, and multiple student terminals 9. The teacher terminal 100 is connected to the multiple student terminals 9 through a network 6. The system 1000 illustrated in FIG. 1 is regarded as a system which is installed for each of classes, sends a problem to the multiple student terminals 9 in a class, and collects answers of students from the multiple student terminals 9, in an educational institution.

The embodiment is not limited to an installation for each of the classes. The teacher terminal 100 corresponding to a server may be installed, and may manage the problem to be sent to the multiple student terminals 9 for each of the classes. In this case, multiple terminals 100 used by teachers and the multiple student terminals 9 used by multiple students for whom respective teachers are responsible are connected the server through the network 6 to form the system 1000.

The teacher terminal 100 is used by the teacher, and includes a storage part 30, an answer accumulation processing part 40, and a comment transmission processing part 50. The teacher terminal 100 stores a student DataBase (DB) 31, a problem DB 32, a student answer DB 33, a determination DB 34, and a comment DB 35 in the storage part 30. Each of the databases 31 through 35 will be described later.

The teacher terminal 100 is regarded as a question setting apparatus which sends the problem to the student terminals 9 and collects answers of the students from the student terminals 9. Also, the teacher terminal 100 monitors the answer state of the students, and determines during the test being performed whether an explanation was insufficient for the problem in the class, based on a correct answer percentage of the problem and a percentage in which an answer time of the problem exceeds a predetermined time. The teacher terminal 100 corresponding to the question setting apparatus urges the teacher to create a comment for the problem for which it is determined that the explanation was insufficient for the problem in the class, and sends the comment created by the teacher to the student terminals 9.

The answer accumulation processing part 40 is regarded as a processing part which sends problem data 4p including the problem, options, and a correct answer from the problem DB 32 to the student terminals 9 of authenticated students, receives answer data 7p including an answer and an answer time of a student from each of the student terminals 9, and records the answer data 7p in the student answer DB 33.

The comment transmission processing part 50 is regarded as a processing part which displays a screen for urging the teacher to create the comment based on a correct answer percentage or a percentage of the students who exceed the answer time by using the student answer DB 33 and the determination DB 34. If the comment is created by the teacher, the comment transmission processing part 50 sends comment data 5p including the created comment to the student terminal 9.

The student DB 31 is used to maintain authentication information for each of the students. The problem DB 32 is used to maintain problems and correct answers and stores the problem data 4p. The student answer DB 33 is used to maintain respective correct answers for the problems for each of the students, and retains the answer data 7p.

The determination DB 34 is used to maintain a reference value to determine necessity of the comment. The comment DB 35 is used to maintain the comments created by the teacher.

The student terminals 9 are regarded as terminals used by the students, and each of the student terminals 9 includes a student processing part 70. Also, a storage part 60 stores a received problem table 61, an answer table 62, and a received comment DB 63. The received problem table 61, the answer table 62, and the received comment DB 63 will be described later.

The student processing part 70 is regarded as a processing part which receives the problem data 4p after the authentication of the student, measures the answer time spent for each of the problems, and sends the answer data 7p including the answer and the answer time of the student to the teacher terminal 100. Also, when the student terminal 9 receives the comment data 5p including the comment created by the teacher from the teacher terminal 100, the student processing part 70 displays the comment alone for the problem to which the student made an incorrect answer or has not answered.

The received problem table 61 is used to maintain the problem data 4p received from the teacher terminal 100. The answer table 62 is used to maintain the answer selected by the student. The answer for each of problems is sent by the answer data 7p to the teacher terminal 100. The received comment DB 63 is used to maintain the comment data 5p received from the teacher terminal 100.

Figure 2:
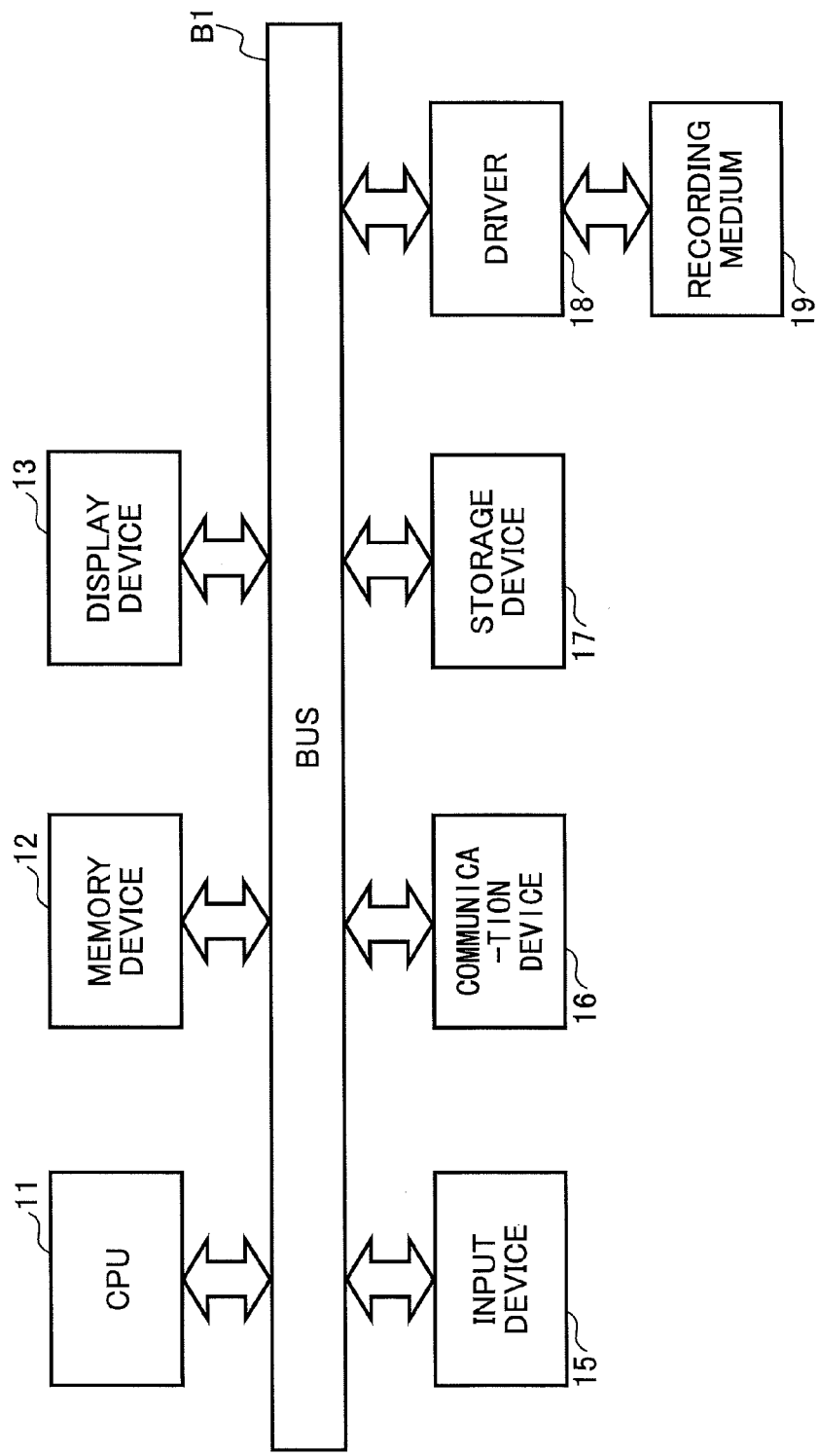
FIG. 2 is a diagram illustrating a hardware configuration of a teacher terminal.

FIG. 2 is a diagram illustrating a hardware configuration of the teacher terminal 100. In FIG. 2, the teacher terminal 100 is controlled by a computer. The teacher terminal 100 includes a Central Processing Unit (CPU) 11, a memory device 12, a display device 13, an input device 15, a communication device 16, a storage device 17, and a driver 18, which are mutually connected through a bus B1.

The CPU 11 controls the teacher terminal 100 in accordance with a program stored in the memory device 12. The memory device 12 may include a Random Access Memory (RAM), a Read-Only Memory (ROM), and the like. The memory device 12 stores the program to be executed by the CPU 11, data for a process conducted by the CPU 11, data acquired in the process, and the like. Also, a part of an area of the memory device 12 is allocated as a working area which is used in the processes conducted by the CPU 11.

The display device 13 displays various information items for control by the CPU 11. The input device 15 may include a mouse, a keyboard, and the like, and is used by the teacher to input the various information items for the process conducted by the teacher terminal 100. The communication device 16 is regarded as a device which connects to the network 6 such as a Local Area Network (LAN) or the Internet and communicates with each of the student terminals 9.

The storage device 17 may include a hard disk unit, and stores data such as programs for conducting various processes and the like. A part of the memory device 12 and/or the storage device 17 corresponds to the storage part 30 illustrated in FIG. 1.

The program realizing the process which is conducted by the teacher terminal 100 may be provided to the teacher terminal 100 by a recording medium 19 such as a Compact Disc Read-Only Memory (CD-ROM) or the like. The recording medium 19 may be formed by a non-transitory (or tangible) computer-readable recording medium. When the recording medium 19 storing the program is set into the driver 18, the driver 18 reads out the program from the recording medium 19, and the program being read out is installed into the storage device 17 through the bus B1. When the CPU 11 is instructed to execute the program, the CPU 11 starts the process in accordance with the program installed into the storage device 17. A recording medium is not limited to the CD-ROM to store the program. The recording medium 19 may be any computer-readable recording medium. The computer-readable recording medium may be a portable recording medium such as a Digital Versatile Disk (DVD) disk, a Universal Serial Bus (USB) memory, or the like, or a semiconductor memory such as a flash memory or the like, as well as the CD-ROM.

The answer accumulation processing part 40, the comment transmission processing part 50, the student DB 31, the student answer DB 33, the determination DB 34, and the comment DB 35, which are illustrated in FIG. 1, are realized by processes performed by the CPU 11 which executes the installed program pertinent to the teacher terminal 100.

Figure 3:
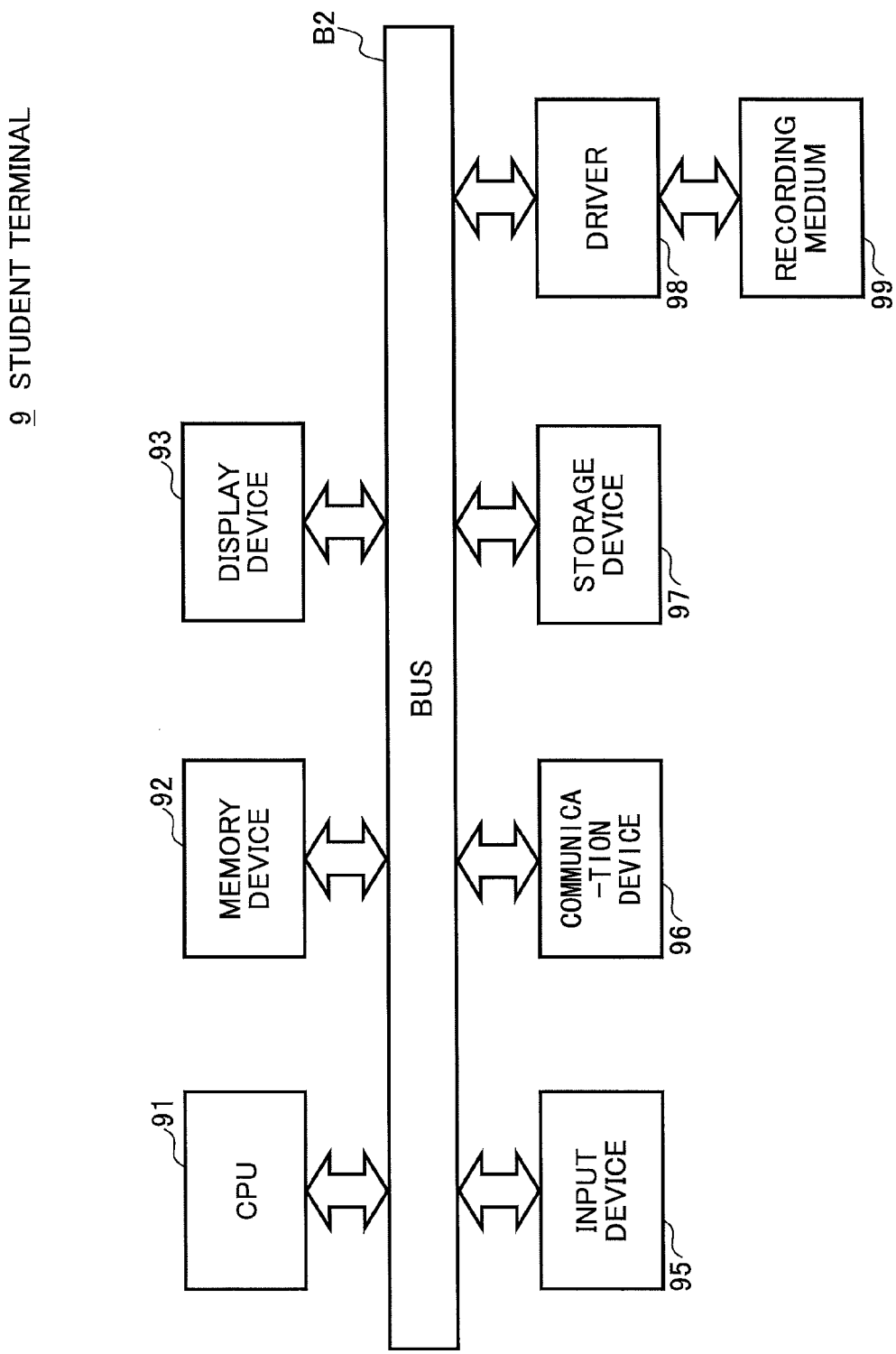
FIG. 3 is a diagram illustrating a hardware configuration of a student terminal.

FIG. 3 is a diagram illustrating a hardware configuration of the student terminal 9. In FIG. 3, the student terminal 9 is controlled by a computer, and includes a Central Processing Unit (CPU) 91, a memory device 92, a display device 93, an input device 95, a communication device 96, a storage device 97, and a driver 98, which are mutually connected via a bus B2.

The CPU 91 controls the student terminal 9 in accordance with a program stored in the memory device 92. The memory device 92 may include a Random Access Memory (RAM), a Read-Only Memory (ROM), and the like. The memory device 92 stores the program to be executed by the CPU 91, data for a process conducted by the CPU 91, data acquired in the process, and the like. Also, a part of an area of the memory device 92 is allocated as a working area which is used in the process conducted by the CPU 91.

The display device 93 displays various information items for control by the CPU 91. The input device 95 may include a mouse, a keyboard, and the like, and is used for the teacher to input the various information items for the process conducted by the student terminal 9. The communication device 96 is regarded as a device which connects to the network 6 such as a Local Area Network (LAN) or the Internet and communicates with each of the teacher terminals 100.

The storage device 97 may include a hard disk unit, and stores data such as programs for conducting various processes and the like. A part of the memory device 92 and/or the storage device 97 corresponds to the storage part 60 illustrated in FIG. 1.

The program realizing the process which is conducted by the student terminal 9 may be provided to the student terminal 9 by a recording medium 99 such as a Compact Disc Read-Only Memory (CD-ROM) or the like. The recording medium 99 may be formed by a non-transitory (or tangible) computer-readable recording medium. When the recording medium 99 storing the program is set into the driver 98, the driver 98 reads out the program from the recording medium 99, and the program being read out is installed into the storage device 97 through the bus B2. When the CPU 91 is instructed to execute the program, the CPU 91 starts the process in accordance with the program installed into the storage device 97. A recording medium is not limited to the CD-ROM to store the program. The recording medium 99 may be any computer-readable recording medium. The computer-readable recording medium may be a portable recording medium such as a Digital Versatile Disk (DVD) disk, a Universal Serial Bus (USB) memory, or the like, or a semiconductor memory such as a flash memory or the like, as well as the CD-ROM.

The student processing part 70, the received problem table 61, the answer table 62, and the received comment DB 63, which are illustrated in FIG. 1, are realized by processes performed by the CPU 91 which executes the installed program pertinent to the student terminal 9.

Next, a data configuration example of the databases 31 through 35 stored in the storage part 30 of the teacher terminal 100 will be described with reference to FIG. 4 through FIG. 8.

FIG. 4 is a diagram illustrating a data configuration example of the student DB 31 of the teacher terminal 100. The student DB 31 illustrated in FIG. 4 is regarded as a database referred to by the answer accumulation processing part 40, and includes items of a "student ID", a "password", a "student name", and the like. The item of the "student ID" indicates identification information for identifying the student, the item of the "password" indicates the authentication information used to authenticate the student, and the item of the "student name" indicates a name of the student.

In the data configuration example, the password of the student of the student ID "201001001" indicates "sjhgpeut87", and the student name indicates "TARO AOKI". In this manner, student IDs, passwords, and student names are maintained for all students.

FIG. 5 is a diagram illustrating a data configuration example of the problem DB 32 of the teacher terminal 100. The problem DB 32 illustrated in FIG. 5 includes items of a "problem ID", a "problem text", an "option_1" to an "option_4", a "correct answer", and the like. The item of the "problem ID" indicates a problem number for specifying the problem, and the item of the "problem text" indicates content of the problem. The items of the "option_1" to the "option_4" include a correct answer for the problem text. The item for the "correct answer" indicates a number of the option (one of 1 to 4) indicating the correct answer.

In this data configuration example, the problem text of the problem ID "10111" presents a question "WHAT GENERATION OF GENERAL WAS IEMITSU TOKUGAWA?", and the option_1, option_2, option_3, and option_4 indicate "3RD", "8TH", "4TH", and "15TH", respectively. For this problem, a number "1" indicating the option_1 is recorded in the item of the "correct answer".

The problem data 4$p$ including information pertinent to the problem stored in the problem DB 32 are sent from the teacher terminal 100 to the student terminal 9.

FIG. 6 is a diagram illustrating a data configuration example of the student answer DB 33 of the teacher terminal 100. The student answer DB 33 illustrated in FIG. 6 is used to maintain an answer, a correct/incorrect answer, and an answer time for each of the problems by corresponding to each of the students based on the answer data 7$p$ sent from each of the student terminals 9. The student answer DB 33 includes items of a "student ID", a "problem ID", an "answer", a "correct/incorrect answer", an "answer time (min)", and the like.

The item of the "student ID" indicates the student ID maintained in the student DB 31 depicted in FIG. 4. The item of the "problem ID" indicates the problem ID maintained in the problem DB 32 depicted in FIG. 5.

The item of the "answer" indicates a number of the option selected by the student. The item of the "correct/incorrect answer" indicates a correct/incorrect answer determination result, and indicates conformity (a correct answer) or nonconformity (an incorrect answer) between the correct answer of the problem DB 32 depicted in FIG. 5 and the number of the option selected by the student. In a case of the conformity (the correct answer), a mark "○" is indicated. In a case of the nonconformity (the incorrect answer), a mark "x" is indicated. Instead of the marks "○", "x", and the like, numerals "1", "0", and the like may used.

Also, the item of the "answer time" indicates time which the student spent to answer the problem. In this example, the answer time is recorded by minute units (min) but may be recorded by a value (sec) converted into seconds.

FIG. 7 is a diagram illustrating a data configuration example of the determination DB 34 of the teacher terminal 100. The determination DB 34 illustrated in FIG. 7 is regarded as a database referred to by the comment transmission processing part 50, and includes items of an "answer percentage", a "correct answer percentage", an "answer time", a "student ratio", and the like.

The item of the "answer percentage" indicates a percentage of a number of students who answered with respect to a total student number. If the percentage of the number of students who answered does not exceed the answer percentage, it is determined that the answering students are few. Necessity of the comment is not determined based on the correct answer percentage and the like. This determination will be described later.

The item of the "correct answer percentage" indicates a reference value to determine whether an answered problem is a difficult problem, and indicates a percentage of a correct answer number with respect to the number of the students who answered.

The item of the "answer time" indicates a reference value to determine whether the student spent more time than expected to answer the problem. The student percentage indicates a reference value to determine, based on time taken to answer, whether the answered problem is a difficult problem, and indicates the percentage of the number of the students who spent more time with respect to a number of students who answered the problem.

In this example, the answer percentage is "30%", the correct answer percentage is "20%", the answer time "MORE THAN OR EQUAL TO 5 MIN", and the student percentage is "40%".

FIG. 8 is a diagram illustrating a data configuration example of the comment DB 35 of the teacher terminal 100. The comment DB 35 depicted in FIG. 8 maintains the comments which the teacher created, by the comment transmission processing part 50, and includes items of a "problem ID", a "problem text", a "teacher comment", and the like.

The item of the "problem ID" indicates a problem ID maintained by the problem DB 32 depicted in FIG. 5. The item of the "problem text" indicates the problem text depicted in FIG. 5. The problem ID and the problem text corresponding to the problem ID are the same as those depicted in FIG. 5. The item of the "teacher comment" indicates a hint, a supplemental explanation, and the like which the teacher inputs to lead the students to the correct answer for the problem text.

Every time the teacher inputs a comment, a record is created in the comment DB 35, and the comment is recorded by corresponding to the problem ID and the problem text in the created record. Also, every time the comment is recorded, the comment data 5$p$ including the problem ID, the problem text, and the comment are sent to the student terminals 9.

Next, data configuration examples of the tables 61 and 62, and the received comment DB 63, which are stored in the storage part 60 of the student terminal 9, will be described with reference to FIG. 9 and FIG. 10.

FIG. 9 is a diagram illustrating a data configuration example of the received problem table 61 of the student terminal 9. The received problem table 61 depicted in FIG. 9 is used to store the problem data 4$p$ sent from the teacher terminal 100 after the authentication of the student, and includes items of a "problem ID", a "problem text", an "option_1" to an "option_4", a "correct answer", and the like. The item of the "problem ID" indicates a problem number specifying the problem, and the problem text indicates content of the problem. The items of the "option_1" to the "option_4" include a correct answer for the problem text. The item of the "correct answer" indicates the number of the option (one of 1 to 4) indicating the correct answer.

FIG. 10 is a diagram illustrating a data configuration example of the answer table 62 of the student terminal 9. The answer table 62 depicted in FIG. 10 includes items of a "problem ID", an "answer", an "answer time (min)", a "correct/incorrect answer", and the like, and records data pertinent to the problem which the student worked.

The item of the "problem ID" indicates the problem ID maintained in the problem DB 32 depicted in FIG. 5. The item of the "answer" indicates the number of the option selected by the student at the student terminal 9. The item of the "answer time (min)" indicates a value acquired by measuring time in minute units from when the problem begins to when the answer is selected from the options.

The item of the "correct/incorrect answer" indicates the correct/incorrect answer determination result, that is, indicates the conformity (the correct answer) or the nonconformity (the incorrect answer) of the number of the option selected by the student with the number of the option indicated by the item of the "correct answer" maintained in the received problem table 61. Each time the student answers the problem, the correct/incorrect answer determination is performed by corresponding to the problem ID. A value of the correct/incorrect answer determination result is stored.

Also, the item of the "correct/incorrect answer" indicates blank for an unanswered problem. Especially, there may be a problem in which the item of the "answer time (min)" records a value and the item of the "answer" indicates blank. In this case, the problem may be difficult for the student to answer and the student may skip this problem. Thus, it is considered that the answer time may include time (a value) until the student decides to skip the problem.

The answer data 7p, to which the student ID is added to the problem ID, the answer, and the answer time (min), are sent from the student terminal 9 to the teacher terminal 100 one problem (one record) at a time.

Also, the answer table 62 is referred to by the student processing part 70, when in comments of the teacher received from the teacher terminal 100, a comment pertinent to a problem incorrectly answered and a comment pertinent to a problem skipped are displayed.

FIG. 11 is a diagram illustrating a data configuration example of the received comment DB 63 of the student terminal 9. The received comment DB 63 depicted in FIG. 11 stores and maintains the comment data 5p received from the teacher terminal 100, and includes items of a "problem ID", a "problem text", a "teacher comment", and the like.

The item of the "problem ID" indicates the problem ID maintained in the problem DB 32 depicted in FIG. 5. The item of the "problem text" indicates the problem text depicted in FIG. 5. The problem ID, and the problem corresponding to the problem ID are the same as contents depicted in FIG. 5. The item of the "teacher comment" indicates a hint, a supplemental explanation, and the like depicted in FIG. 8 which the teacher input to lead the students to the correct answer for the problem text.

By the student processing part 70, records, which correspond to the problem ID of the problem being incorrectly answered and the problem ID of the problem being skipped, are selected from the received comment DB 63 based on the correct/incorrect answer determination result of the item of the "correct/incorrect answer" depicted in FIG. 10. Based on the selected records, the teacher's comments are displayed at the display device 93 of the student terminal 9.

Figure 12:
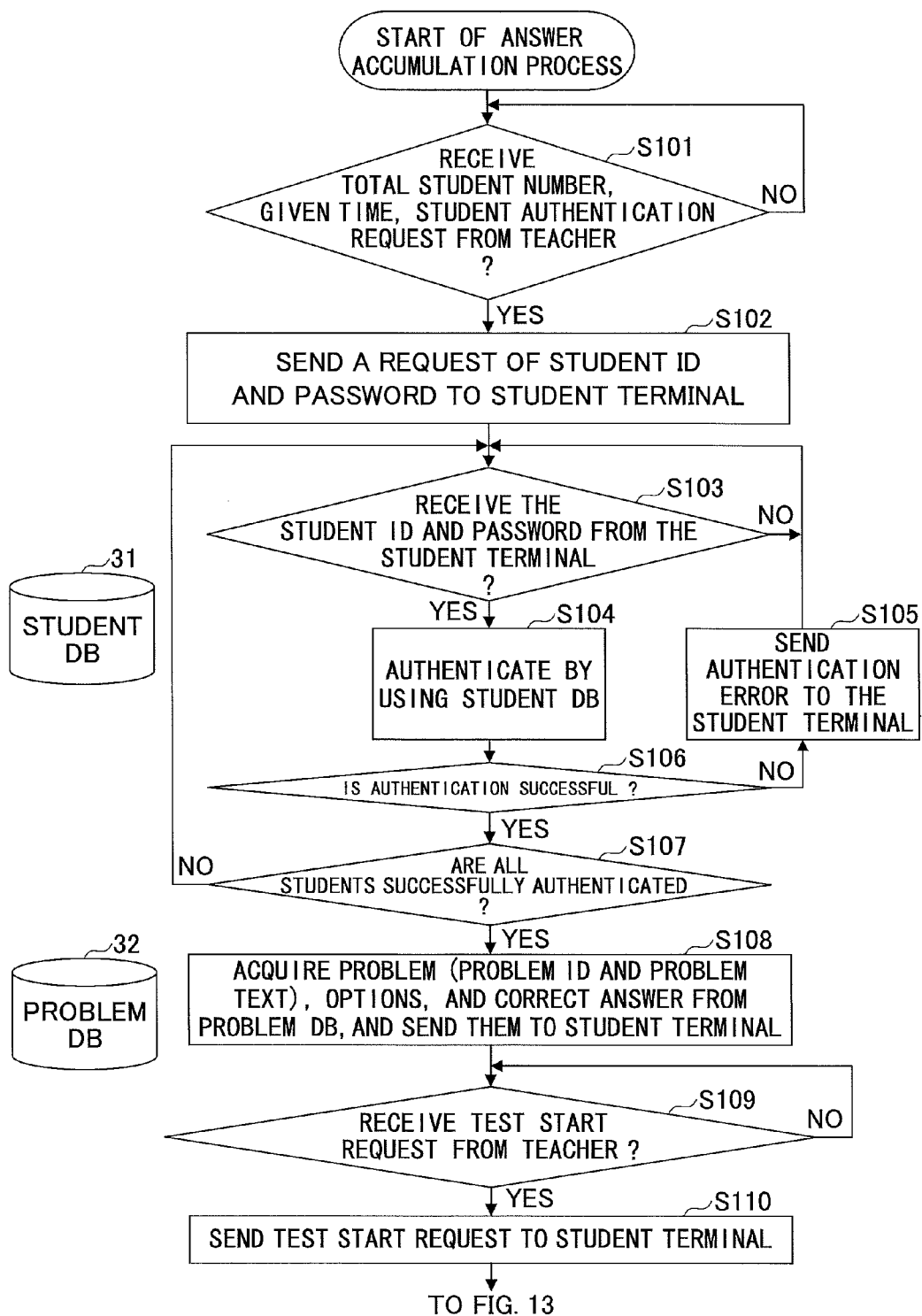
FIG. 12 is a flowchart for explaining an answer accumulation process by an answer accumulation processing part of the teacher terminal.
Figure 13:
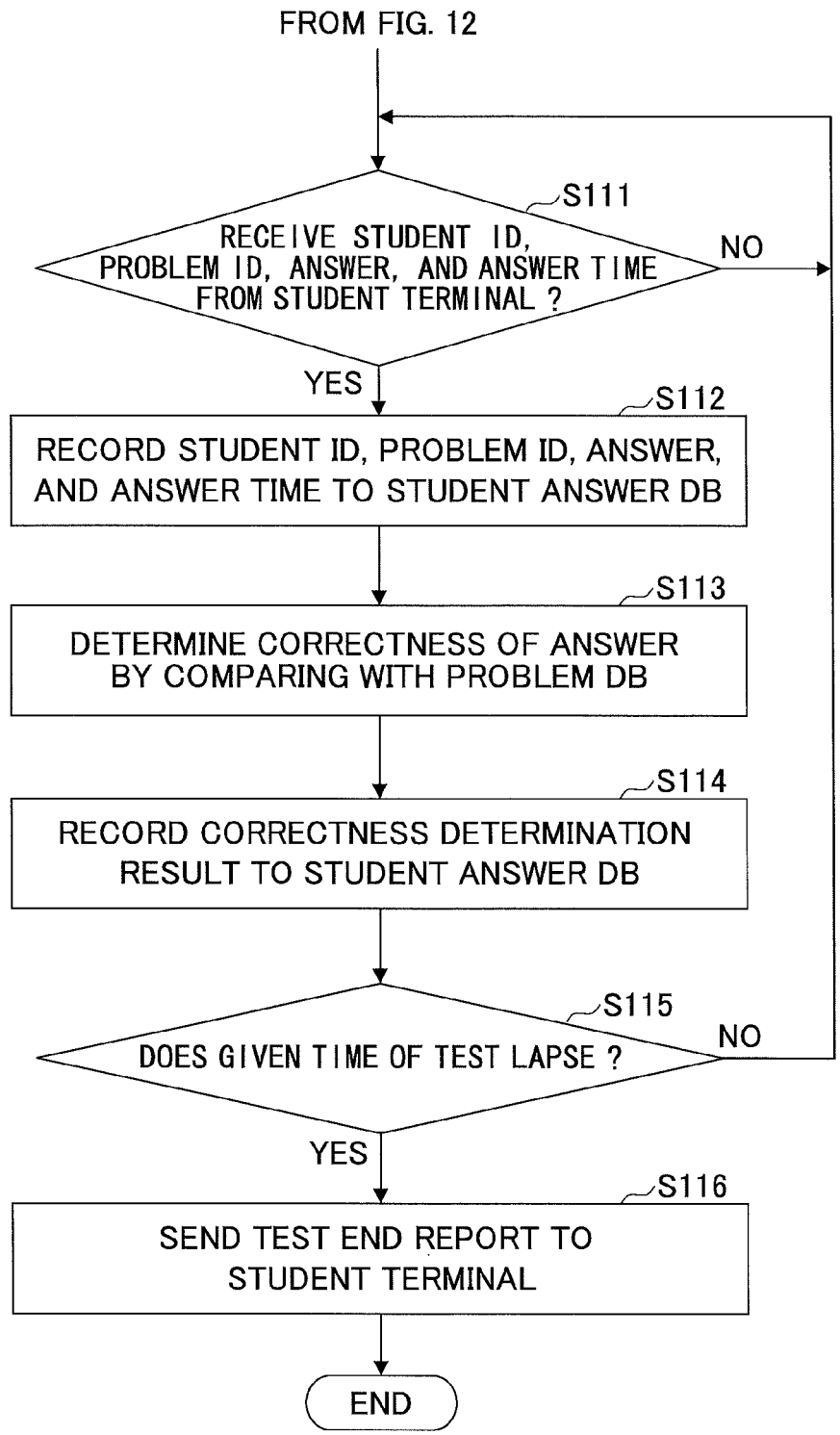
FIG. 13 is a flowchart for explaining the answer accumulation process by the answer accumulation processing part of the teacher terminal.

Next, processes in the teacher terminal 100 will be described with reference to FIG. 12 through FIG. 15. FIG. 12 and FIG. 13 are flowcharts for explaining an answer accumulation process by the answer accumulation processing part 40 of the teacher terminal 100. A sequence of the answer accumulation process is explained by steps S101 to S116 illustrated in FIG. 12 and FIG. 13.

The answer accumulation processing part 40 of the teacher terminal 100 determines whether the total student number, a given time, and a student authentication request are received from the teacher (step S101). When the total student number, the given time, and the student authentication request are not received from the teacher, step S101 is repeated until receiving from the teacher. On the other hand, when the total student number, the given time, and the student authentication request are received from the teacher, the answer accumulation processing part 40 stores the student total number and the given time in the working area in the storage part 30.

In response to the student authentication request, the answer accumulation processing part 40 sends a request of the student ID and the password to the student terminal 9 (step S102). The answer accumulation processing part 40 determines whether the student ID and the password are received from the student terminal 9 (step S103). When the student ID and the password are not received, the answer accumulation processing part 40 repeats step S103 until receiving those. On the other hand, when the student ID and the password are received, the answer accumulation processing part 40 authenticates the student by using the student DB 31 (step S104).

The answer accumulation processing part 40 determines whether the authentication is successful (step S105). When the authentication fails, the answer accumulation processing part 40 sends an authentication error to the student terminal 9 (step S106), and goes back to step S103 to authenticate the student in the same manner.

On the other hand, the answer accumulation processing part 40 further determines whether all students are successfully authenticated (step S107). When all students are not successfully authenticated, the answer accumulation processing part 40 goes back to step S103 and repeats the above described process in the same manner.

When all students are successfully authenticated, the answer accumulation processing part 40 acquires the problem (the problem ID and the problem text), the options_1 through the option_4, and the correct answer from the problem DB 32, and sends those as the problem data 4p to the student terminal 9 (step S108).

After that, the answer accumulation processing part 40 determines whether a test start request is received from the teacher (step S109). When the test start request is not received, the answer accumulation processing part 40 repeats step S109 until receiving the test start request. On the other hand, when the test start request is received, the answer accumulation processing part 40 sends the test start request to the student terminal 9 (step S110).

After the test is started, the answer accumulation processing part 40 determines whether the answer data 7p, which includes the student ID, the problem ID, the answer, and the answer time, are received (step S111). When the answer data 7p are not received, the answer accumulation processing part 40 repeats step S111 until receiving the answer data 7p. On the other hand, when the answer data 7p are received, the answer accumulation processing part 40 records the student ID, the problem ID, the answer, and the answer time, which are included in the answer data 7p, in the student answer DB 33 (step S112).

The answer accumulation processing part 40 acquires a value set in the item of the "correct answer" of the problem DB 32 by using the problem ID included in the answer data 7p, and determines, by comparing the answer included in the answer data 7p with the acquired value, whether the answer of the student is correct or incorrect (step S113). The answer accumulation processing part 40 records the correct/incorrect answer determination result acquired by this correct/incorrect answer determination in the student answer DB 33 (step S114).

After that, the answer accumulation processing part 40 determines whether the given time of the test lapses (step S115). When the given time of the test does not lapse, the answer accumulation processing part 40 goes back to step S111, and repeats the above described process in the same manner. On the other hand, when the given time of the test lapses, the answer accumulation processing part 40 sends a test end report to the student terminal 9 (step S116), and terminates this answer accumulation process.

Figure 14:
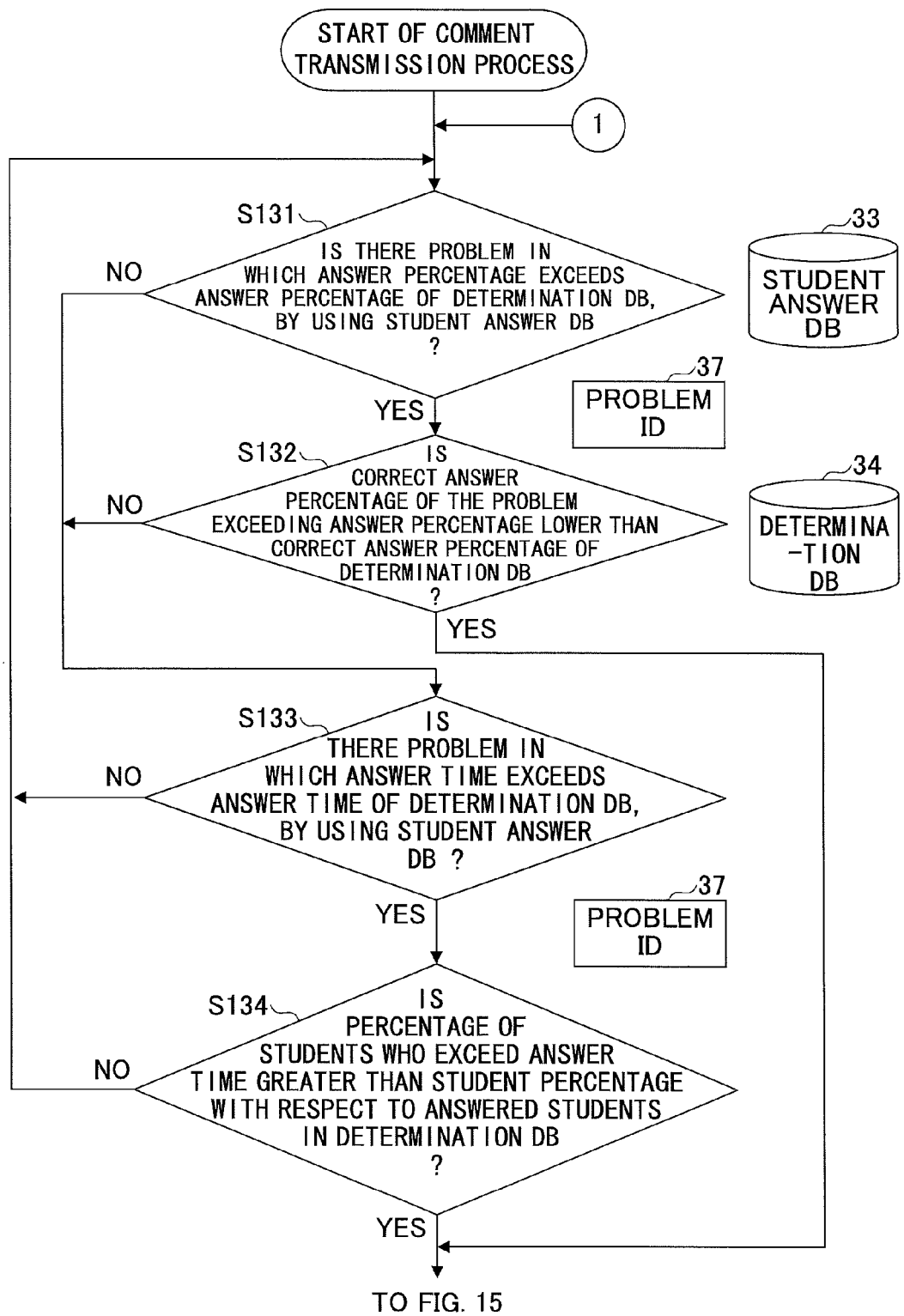
FIG. 14 is a flowchart for explaining a comment transmission process by a comment transmission processing part of the teacher terminal.
Figure 15:
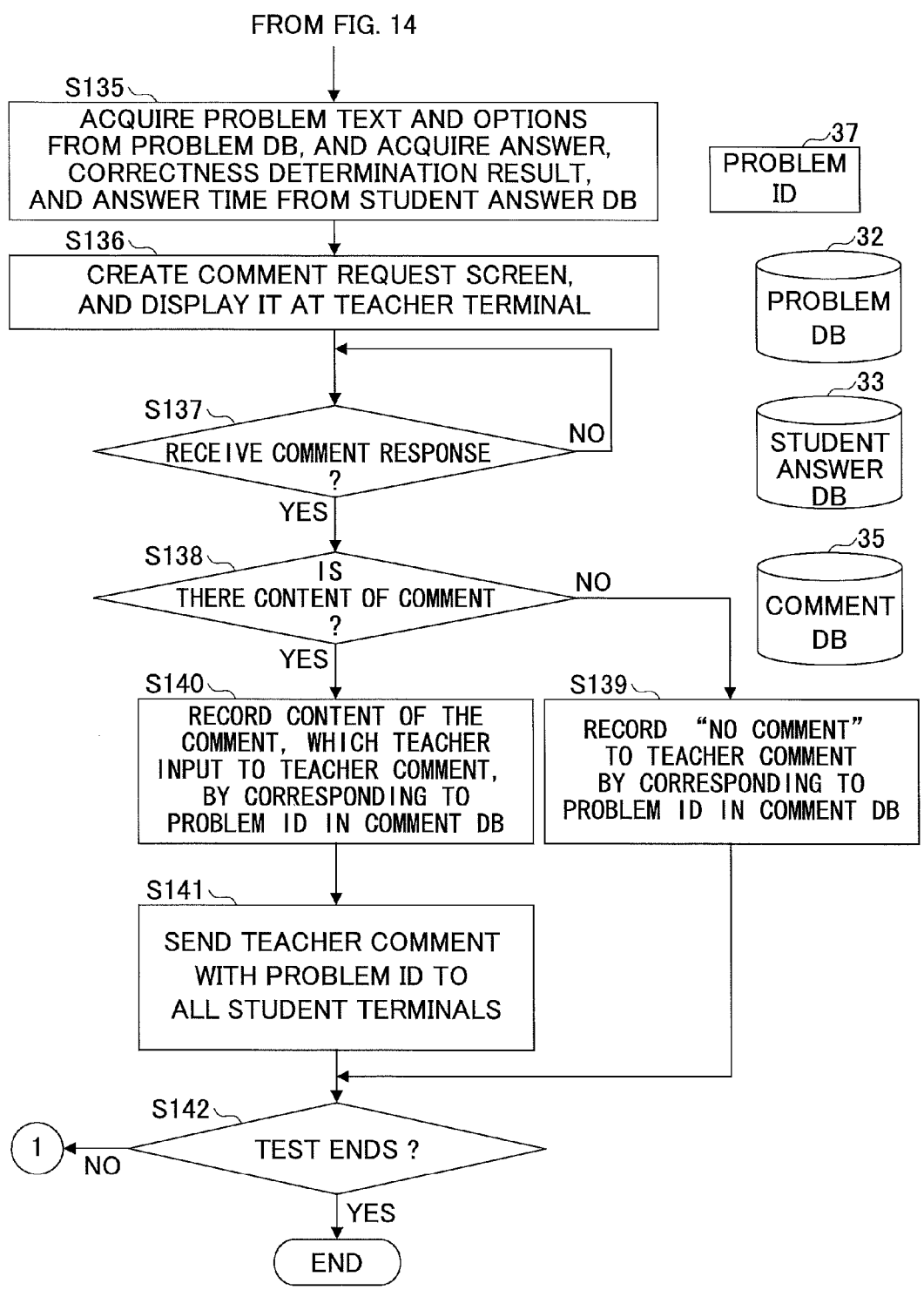
FIG. 15 is a flowchart for explaining the comment transmission process by the comment transmission processing part of the teacher terminal.

FIG. 14 and FIG. 15 are flowcharts for explaining a comment transmission process by the comment transmission processing part 50 of the teacher terminal 100. A sequence of the comment transmission process is explained by steps S131 to S142 illustrated in FIG. 14 and FIG. 15.

The comment transmission processing part 50 of the teacher terminal 100 determines, by using the student answer DB 33, whether the answer percentage exceeds the answer percentage of the determination DB 34 (step S131). The answer accumulation processing part 40 aggregates an answer number for each problem ID by referring to the student answer DB 33, and calculates a percentage of the answer number to the total student number which is stored in the storage part 30 by the answer accumulation processing part 40 in step S101 in FIG. 12.

The answer accumulation processing part 40 compares the calculated percentage to the answer percentage "30%" stored in the determination DB 34, and stores the problem ID exceeding the answer percentage "30%" to the problem ID 37 in the working area of the storage part 30. In this case, by referring to the comment DB 35, a case in which the comment has been already created is eliminated.

In step S131, when it is determined that there is no problem exceeding the answer percentage in step S131, the comment transmission processing part 50 advances to step S133.

On the other hand, when it is determined that there is a problem exceeding the answer percentage in step S131, the comment transmission processing part 50 determines whether the correct answer percentage of the problem exceeding the answer percentage is lower than the correct answer percentage "20%" of the determination DB 34 (step S132). In step S132, it is determined whether there is a problem in which the student likely answers incorrectly.

The comment transmission processing part 50 acquires the correct answer percentage for each of the problems by calculating a percentage of the correct answer number to a number of students who answered (hereinafter, called "an answered student number") by using the student answer DB 33 related to problem ID 37. The answered student number is acquired by counting records indicating a value in the item of the "answer" corresponding to the problem ID 37 in the student answer DB 33. The correct answer percentage is acquired by counting records indicating the correct answer (O) in the item of the "correct/incorrect answer" corresponding to the problem ID 37 in the student answer DB 33.

In step S132, if it is determined that the correct answer percentage of the problem exceeding the answer percentage is lower than the correct answer percentage "20%" of the determination DB 34, the comment transmission processing part 50 determines that the comment is needed to be created, and advances to step S135 in FIG. 15 to create the comment.

On the other hand, if it is determined that the correct answer percentage is not lower than the correct answer percentage "20%" of the determination DB 34, the comment transmission processing part 50 determines, by using the student answer DB 33, whether there is a problem in which the answer time of the student exceeds the answer time "more than 5 MIN" of the determination DB 34 (step S133). In step S133, it is determined whether there is a problem which is not easy for the student to solve.

The comment transmission processing part 50 counts a number of records (the number of the students who needed the answer time "5 MIN") in which the time, which the student spent to answer, exceeds the answer time "5 MIN" for each problem ID by using the student answer DB 33. The comment transmission processing part 50 stores the problem ID and the number of the students which is counted, for the problem ID 37 in the working area of the storage part 30. In this case, by referring to the comment DB 35, a case in which the comment has been already created is eliminated.

When it is determined that there is no problem in which the answer time of the student exceeds the answer time "5 MIN" of the determination DB 34 in step S133, the comment transmission processing part 50 determines that the comment is not needed to be created, goes back to step S131, and repeats the above described process in the same manner.

On the other hand, when it is determined that there is a problem in which the answer time of the student exceeds the answer time "5 MIN" of the determination DB 34 in step S133, the comment transmission processing part 50 determines whether a percentage of the student who exceeds the answer time "5 MIN" is higher than the student percentage "40%" for the answered student number in the determination DB 34 (step S134).

The comment transmission processing part 50 counts the answered student number by referring to the student answer DB 33 by using the problem ID 37. Then, the comment transmission processing part 50 calculates a percentage of the number of the students, who needed the answer time "5 MIN", with respect to the answered student number. The number of the students is acquired in step S133. The comment transmission processing part 50 compares the calculated percentage with the student percentage "40%" of the determination DB 34.

When it is determined in step S134 that the calculated percentage is not higher than the student percentage "40%", the comment transmission processing part 50 determines that the comment is not needed to be created, goes back to step S131, and repeats the above described process in the same manner.

On the other hand, when it is determined in step S134 that the calculated percentage is higher than the student percentage "40%", the comment transmission processing part 50 advances to step S135 in FIG. 15 to create the comment.

The comment transmission processing part 50 acquires content of the problem text and values of the option_1 to the option_4, which are stored in the record of the problem ID 37, from the problem DB 32, and acquires a value of the answer, the correct/incorrect answer determination result, and sa value of the answer time pertinent to the problem ID 37 from the student answer DB 33 (step S135). Then, the comment transmission processing part 50 displays a comment request screen 150 depicted in FIG. 18 at the display device 13 of the teacher terminal 100, by using the values acquired in step S135 (step S136).

After the comment request screen 150 is displayed, the comment transmission processing part 50 determines whether a comment response is received from the teacher (step S137). When the comment response has not been received, the comment transmission processing part 50 repeats step S137 until receiving the comment response. On the other hand, when the comment response is received, the comment transmission processing part 50 determines whether there is content of the comment (step S138).

When it is determined in step S138 that there is no content of the comment, the comment transmission processing part 50 records no comment in the item of the "teacher comment" by corresponding to the problem ID 37 in the comment DB 35 (step S139), and advances to step S142.

On the other hand, when it is determined in step S138 that there is the content of the comment, the comment transmission processing part 50 records the content of the comment input by the teacher in the item of the "teacher comment" by corresponding to the problem ID 37 in the comment DB 35 (step S140). The comment transmission processing part 50 sends the comment created by the teacher with the problem ID 37 to all student terminals 9 (step S141). The comment data 7p including the problem ID 37 and the comment are sent to each of the student terminals 9.

The comment transmission processing part 50 determines whether the test ends (step S142). The comment transmission processing part 50 determines whether the given time, which is indicated by the teacher in step S101 in FIG. 12, lapses. When the given time has not lapsed, the comment transmission processing part 50 goes back to step S131 in FIG. 14, and repeats the above described process in the same manner. On the other hand, when it is determined that the given time has lapsed and the test ends, the comment transmission processing part 50 terminates this comment transmission process.

Figure 16:
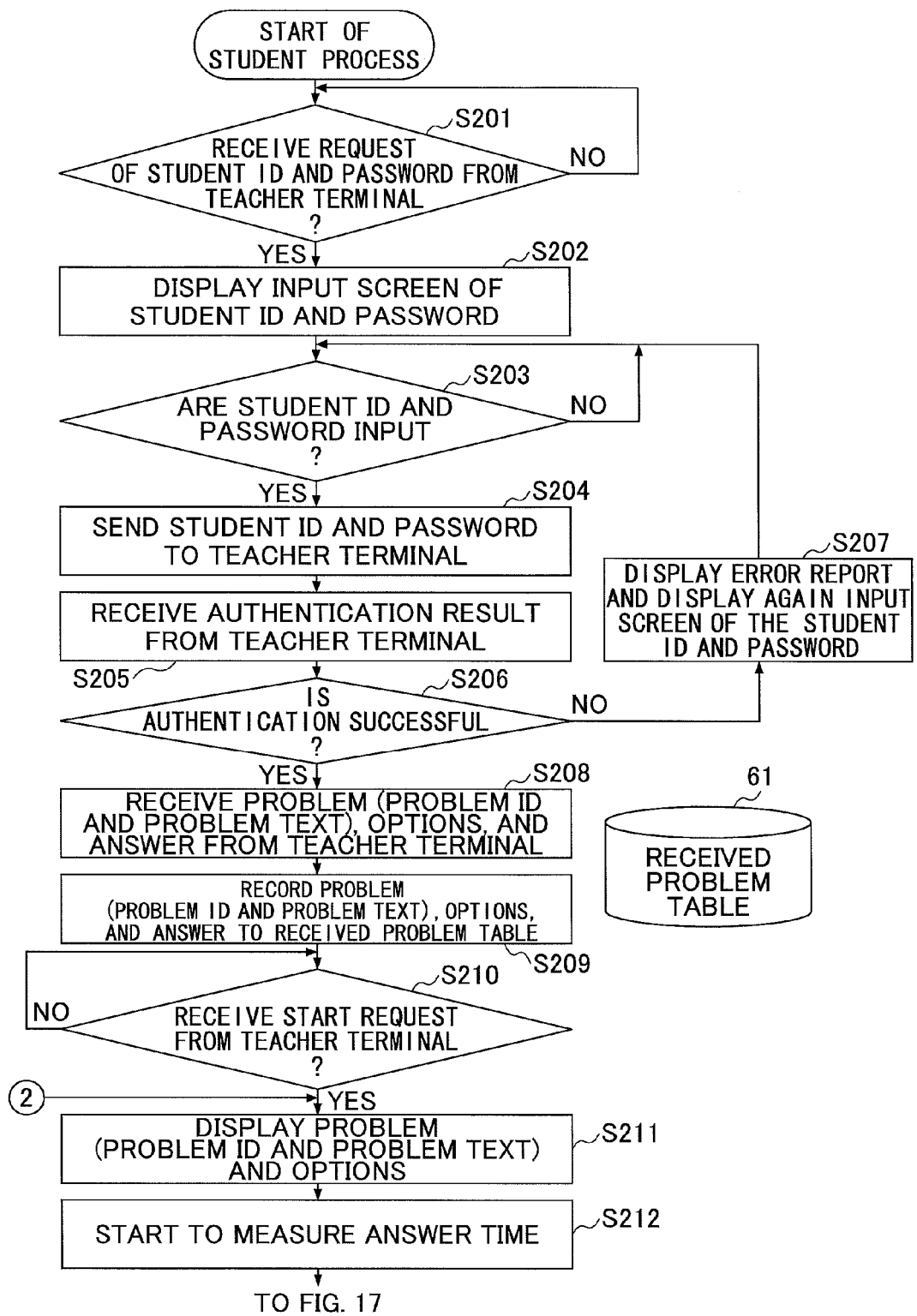
FIG. 16 is a flowchart for explaining a student process by a student processing part of the student terminal.
Figure 17:
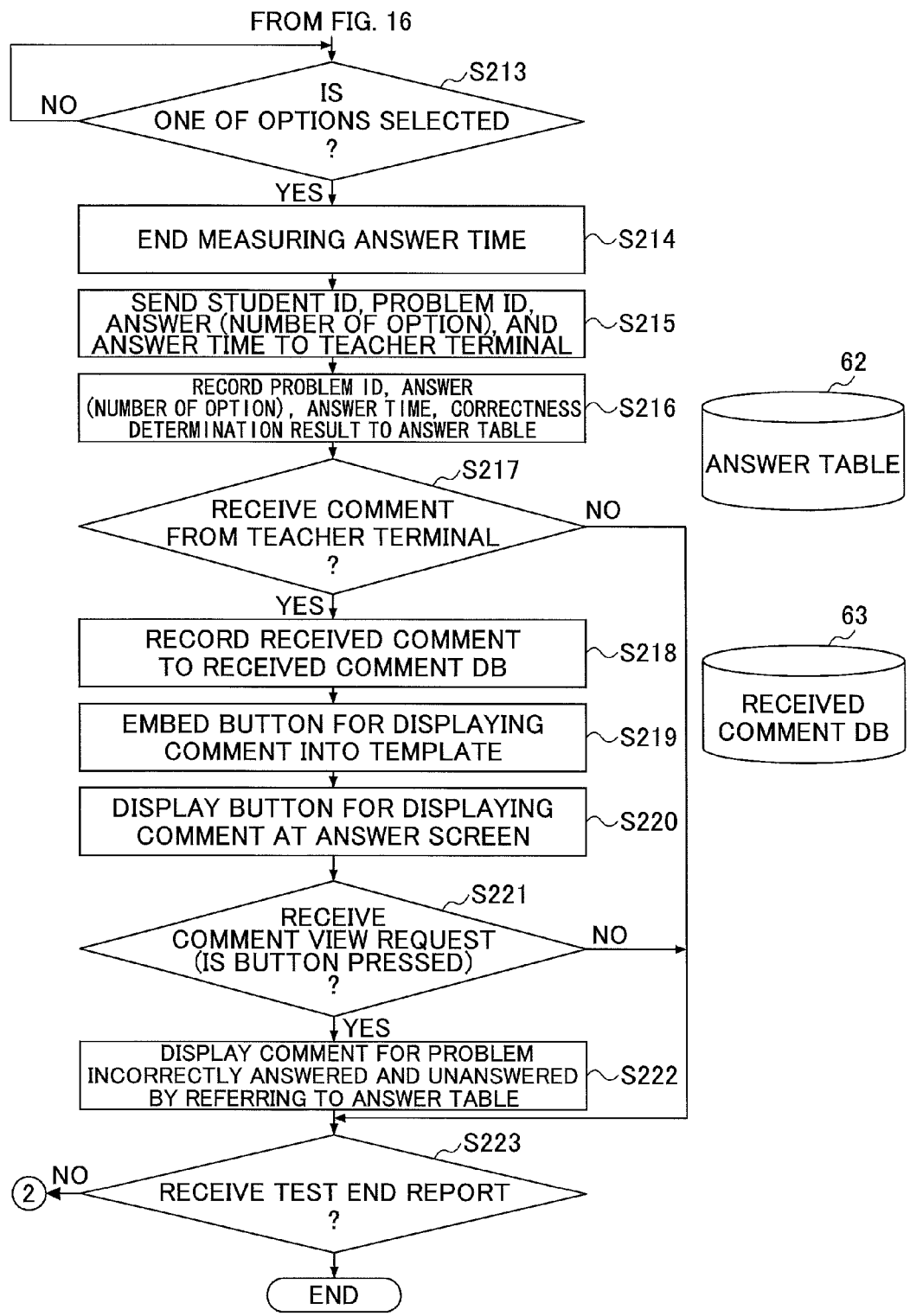
FIG. 17 is a flowchart for explaining the student process by the student processing part of the student terminal.

Next, processes in the student terminal 9 will be described with reference to FIG. 16 and FIG. 17. FIG. 16 and FIG. 17 are flowcharts for explaining the student process by the student processing part 70 of the student terminal 9. A sequence of the student process is explained by steps S201 to S223 illustrated in FIG. 16 and FIG. 17.

The student processing part 70 of the student terminal 9 determines whether the request of the student ID and the password is received from the teacher terminal 9 (step S201). When the request is not received, the student processing part 70 repeats step S201 until receiving the request. On the other hand, when the request is received, the student processing part 70 displays an input screen for inputting the student ID and the password at the display device 93 of the student terminal 9 (step S202).

After displaying the input screen, the student processing part 70 determines whether the student ID and the password are input by the student (step S203). When the student ID and the password are not input, the student processing part 70 repeats step S203 until the student inputs the student ID and the password. On the other hand, when the student ID and the password are input, the student processing part 70 sends the student ID and the password to the teacher terminal 100 (step S204), and acquires an authentication result from the teacher terminal 100 (step S205).

The student processing part 70 determines whether the authentication result indicates that the student is successfully authenticated (step S206). When the authentication result indicates that the authentication of the student has failed, the student processing part 70 displays an error report at the display device 93, and displays the input screen of the student ID and the password again (step S207). The student processing part 70 goes back to step S203, and repeats the above described process in the same manner.

On the other hand, when the authentication result indicates that the authentication of the student is successful in step S206, the student processing part 70 receives the problem data 4p including the problem (the problem ID and the problem text), the option_1 to the option_4, and the answer from the teacher terminal 100 (step S208), and records the problem data 4p in the received problem table 61 (step S209).

The student processing part 70 determines whether a start request is received from the teacher terminal 100 (step S210). When the start request is not received, the student processing part 70 repeats step S210 until receiving the start request.

On the other hand, when the start request is received, the student processing part 70 displays the problem (the problem ID and the problem text) and the option_1 to the option_4 which are received from the teacher terminal 100, at the display device 93 (step S211), and starts to measure the answer time (step S212). After that, the student processing part 70 advances to step S213 in FIG. 17.

The student processing part 70 determines whether one of the option_1 to the option_4 is selected by the teacher (step S213). When the student does not select, the student processing part 70 repeats step S213 until the student selects one of the option_1 to the option_4.

On the other hand, when it is determined in step S213 that the student selects one of the option_1 to the option_4, the student processing part 70 ends measuring of the answer time (step S214), and sends the answer data 7p including the student ID, the problem ID, the answer (the number of the option selected by the student), and the answer time, to the teacher terminal 100 (step S215). Also, the student processing part 70 records the student ID, the problem ID, the answer (the number of the option selected by the student), the answer time, and the correct/incorrect answer result in the answer table 62 (step S216). The correct/incorrect answer result indicates a result from comparing the number of the option selected by the student with the number of the option indicated by the item of the "correct answer" maintained in the received problem table 61, and is recorded in the item of the "correct/incorrect answer" of the answer table 62.

After sending the answer data 7p, the student processing part 70 determines whether the student terminal 9 receives the comment from the teacher terminal 100 (step S217). The student processing part 70 determines whether the student terminal 9 receives the comment data 5p including the problem ID, the problem text, and the comment created by the teacher from the teacher terminal 100. When the student terminal 9 does not receive the comment, the student processing part 70 advances to step S223.

On the other hand, when the student terminal 9 receives the comment in step S217, the student processing part 70 records the problem ID, the problem text, and the comment included in the comment data 5p corresponding to each other in the received comment DB 63 (step S218).

Next, the student processing part 70 embeds a button (a button 260a in FIG. 19) to display the comment into a template of an student answer screen to be displayed at the display device 93 (step S219), and displays the button to display the comment in the student answer screen displayed at the display device 93 (step S220). By displaying the button to display the comment in the student answer screen, it is possible to inform the student that there is a problem which the student needs to review in the answered problems.

After displaying the button to display the comment, the student processing part 70 determines whether a comment view request is received from the student (step S221). That is, the student processing part 70 determines whether the student presses the button to display the comment. When the comment view request is not received, the student processing part 70 advances to step S223.

On the other hand, when the comment view request is received in step S221, the student processing part 70 displays the comments at the display device 93 only for problems incorrectly answered and unanswered, by referring to the value of the item of the "correct/incorrect answer" in the answer table 62 (step S222). The student processing part 70 acquires the problem ID of each of the incorrectly answered problems and not answered problems by referring to the value of the item of the "correct/incorrect answer" in the answer table 62. Also, when the acquired problem ID exists in the comment DB 35, the student processing part 70 displays the content of the problem text and the content of the teacher comment which correspond to the existing problem ID at the display device 93.

When the student refers to the teacher comment displayed at the display device 93, and reviews and answers (selects one of the options), the student processing part 70 determines in a determination process of step S213 that the student selects one of the options, and perform the above described process from step S214 in the same manner.

After that the student processing part 70 determines whether the student terminal 9 receives the test end report from the teacher terminal 100 (step S223). When the student terminal 9 does not receive the test end report, the student processing part 70 goes back to step S211 in FIG. 16, and repeats the above described process in the same manner. On the other hand, when the student terminal 9 receives the test end report, the student processing part 70 ends this student process.

Next, various screen examples, which may be displayed at the teacher terminal 100 and the student terminal 9, will be described with reference to FIG. 18 to FIG. 20.

FIG. 18 is a diagram illustrating an example of a comment request screen 150 displayed at the teacher terminal 9. The comment request screen 150 depicted in FIG. 18 includes a problem ID display area 150a, a problem text display area 150b, an option display area 150c, an answer state display area 150d, a comment input area 150e, a button 150f for comment transmission, and a button 150g for suppressing the comment transmission.

The problem ID display area 150a displays the problem ID 37 specified in step S131 through S134 in FIG. 14. The problem text display area 150b displays the content of the problem text corresponding to the problem ID 37 in the problem DB 32. The option display area 150c displays each content of the option_1 through the option_4 corresponding to the problem ID 37 in the problem DB 32.

The answer state display area 150d displays contents of the student ID, the answer, the correct/incorrect answer, and the answer time (min) pertinent to the problem ID 37 specified in steps S131 through S134, which are acquired from the student answer DB 33, for each student ID.

The comment input area 150e is used for user to input the comment for the problem text displayed in the problem text display area 150b. If the teacher considers that the explanation in the lesson was insufficient, the teacher may input the comment to complement the explanation to the comment input area 150e.

The button 150f for the comment transmission is regarded as a button to conduct a transmission indication to the student terminals 9 in order to send an explanation text, which the teacher inputs into the comment input area 150e, and to end the comment request screen 150. The button 150g for suppressing the comment transmission is regarded as a button for the teacher to use not to send the comment for the problem text displayed in the problem text display area 150b and to end the comment request screen 150.

The comment request screen 150 is displayed at the display device 13 of the teacher terminal 100 when the comment of the teacher is needed. It is possible for the teacher to comprehend which problem was likely difficult to answer for the students. Also, it is possible for the teacher to make the comment in order for the students to easily understand that problem.

Figure 19:
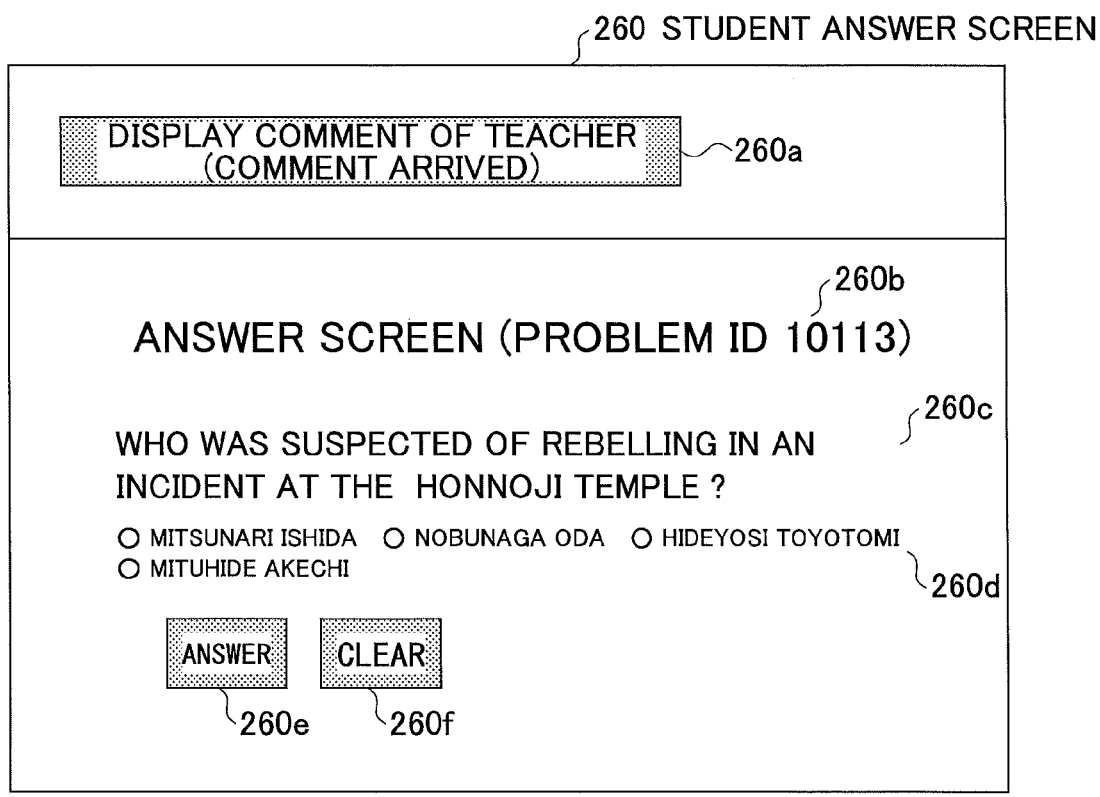
FIG. 19 is a diagram illustrating an example of a student answer screen displayed at the teacher terminal.

FIG. 19 is a diagram illustrating an example of a student answer screen displayed at the teacher terminal 9. A student answer screen 260 depicted in FIG. 19 includes the button 260a for displaying the comment of the teacher, a problem ID display area 260b, a problem text display area 260c, an option display area 260d, an answer button 260e, and a clear button 260f.

The button 206a for displaying the comment of the teacher is displayed when the comment data 5p are received from the teacher terminal 100, and informs the student that there is the comment from the teacher. By the teacher selecting the button 260a, a comment display screen 270 as depicted in FIG. 20 is displayed at the display device 93 of the student terminals 9.

The problem ID display area 260b displays the problem ID of the problem which is currently displayed. The problem text display area 260c displays the content of the problem text corresponding to the problem ID displayed in the problem ID display area 260b in the received problem table 61. The option display area 260d displays contents of the option_1 to the option_4 corresponding to the problem ID displayed at the problem ID display area 260b in the received problem table 61, and is also a selectable area for the student.

The answer button 260e is used to send the answer, which is selected by the student from the option display area 260d, to the teacher terminal 100. When the teacher presses the answer button 260e, the answer data 7p (FIG. 1), which include the answer (the number of the option) selected by the student, are sent to the teacher terminal 100.

The clear button 260f is used to cancel the answer selected by the student from the option display area 260d. When the student presses the clear button 260f, the selection of the student is reset.

FIG. 20 is a diagram illustrating an example of a comment display screen 270 displayed at the student terminal 9. The comment display screen 270 depicted in FIG. 20 includes a message display area 270a, a comment list display area 270b, a "SEND" button 270c, a "CLEAR" button 270d, and a "BACK" button 270e.

The message display area 270a displays a message to urge the student to review the answer by referring to the comment of the teacher. The message display area 270a may display the message of "TEACHER SENT YOU COMMENTS FOR PROBLEMS BELOW. PLEASE REVIEW YOUR ANSWER".

The comment list display area 270b displays comments corresponding to respective problem IDs of the incorrectly answered problems and not answered problems by a process of step S222 in FIG. 17. The comment list display area 270b includes items of a "problem ID", "your answer", a "problem text", a "teacher comment", a "reviewed answer input field", and the like.

The item of the "problem ID" indicates a problem number for specifying the problem. The item of "your answer" indicates the number of the option selected by the student. The item of the "problem text" indicates the content of the problem. The teacher comment is acquired from the comment data 7p sent from the teacher terminal 100, and corresponds to the content of the comment recorded in the received comment DB 63.

The item of the "reviewed answer input field" displays the numbers of options which the student did not select as his/her answer and contents of these options. Thus, it is possible for the student to read the contents of the problems texts again and review the answer by referring to the contents of the teacher comments. The student reviews the answer, and selects one number of the options listed in the reviewed answer input field.

The "SEND" button 270c is used to send the answer selected by the student from the reviewed answer input field to the teacher terminal 100. When the student presses the "SEND" button 270c after reviewing the answer and selecting one of the options from the reviewed answer input field, the answer data 7p including the number of the selected option is sent to the teacher terminal 100.

The "CLEAR" button 270d is used to reset the answer selected by the student from the reviewed answer input field. The student presses the "CLEAR" button 270d, when the student cancels the answer selected from the options in the reviewed answer input field.

The "BACK" button 270e is used to go back to the student answer screen 260. The student presses the "BACK" button 270e when going back from the comment display screen 270 to the student answer screen 260.

For any problem, immediately after the student solved the problem, the more the comprehension of the student is improved by a practice of iteratively pondering the problem. Also, if the problem is to check the comprehension as a small test (the drill) in the class, the problem is different from an entrance examination. In the embodiment, it is possible to give a chance to further ponder the same problem to the student as soon as possible. Hence, it is possible to improve the comprehension of the students.

The students display the comment display screen 270 from the student answer screen 260, and review the problem at the comment display screen 270. It is possible to improve the comprehension of the students for the problem.

As described above, the system 1000 according to the embodiment determines the problem which is considered to improve the comprehension of the students by the comment of the teacher, and requests the teacher to create the comment timely, based on the answer state of the multiple students during the test. It is possible for the teacher to know, during the test, which problem the students are likely to incorrectly answer, or to know the problem which needs the comment of the teacher since the students take time for answering the problem or the like. Accordingly, it is possible for the teacher to create the comment related to the problem of interest during a test time. It is possible to effectively utilize the test time so as to appropriately complement the explanation which was insufficient in a previous lesson.

The students refer to the comment related to the problem which the student answered, and review the problem by referring to the comment. The students iteratively solve the problem. Thus, it is possible to improve the comprehension of the students. The students refer to the comment for the problem and iteratively ponder the problem while taking the test, so as to understand the problem better. It is possible for the students to derive the correct answer.

In the embodiment, when it is determined, based on the answer state of the students for a problem during the test, that a previous lesson was not sufficiently explained, it is possible for the teacher to appropriately make comments for the problem.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A question setting apparatus, comprising:
a storage part;
a processor; and
a program that is stored in the storage part and, when executed by the processor, causes the processor to perform a process,
wherein the storage part stores
a problem database which maintains problem data including a problem, a correct answer to the problem, and a problem identifier to identify the problem;
a reference answer percentage, a reference correct answer percentage, a reference answer time, and a reference percentage of students exceeding the reference answer time; and
a student answer database which maintains answer data including answers of respective students for the problem, the problem identifier which corresponds the answers to the problem, answer times taken by respective students to answer the problem, and a correct/incorrect answer determination results for the respective students,
the processor is configured to transmit, through a network, the problem and the problem identifier to respective student terminals of the respective students connected to the question setting apparatus through the network, to thereby administer a test in which the problem is displayed by the student terminal, and
when the processor executes the program, the process performs
in response to receiving respective answer data during the test from the respective student terminals of the respective students, for each of the respective answer data:
recording the respective answer data, which includes an answer time taken to answer the problem,
producing the correct/incorrect answer determination result by using the problem database and the problem identifier included in the respective answer data to identify the problem and the correct answer of the problem, and
recording the correct/incorrect answer determination result;
during the test, to determine a comprehension level of the students in comprehending the problem,
using answer data recorded in the student answer database to determine a first percentage of a number of students who answered the problem with respect to a total student number,
in response to the first percentage being determined to exceed the reference answer percentage, determining that the comprehension level is a trigger to notify a user of the question setting apparatus to generate a supplemental explanation of the problem, upon determining that a second percentage of a number of correct answers with respect to the number of students who answered the problem is lower than the reference correct answer percentage, the second percentage determined based on the correct/incorrect answer determination results recorded in the student answer database, and in response to the first percentage being determined as not exceeding the reference answer percentage, determining that the comprehension level is a trigger to notify the user of the question setting apparatus to generate a supplemental explanation of the problem, upon determining that a third percentage of the students who exceed the reference answer time is higher than the reference percentage of students exceeding the reference answer time, the third percentage determined based on the answer times recorded in the student answer database;

in response to determining that the comprehension level is a trigger to notify the user to generate a supplemental explanation of the problem, notifying the user of the question setting apparatus to generate the supplemental explanation of the problem to guide the students to select a correct answer of the problem; and receiving the supplemental explanation from the user, and sending the supplemental explanation of the problem to the respective student terminals through the network during the test before the test ends.

2. The question setting apparatus as claimed in claim 1, wherein the sending includes creating a comment request screen by acquiring the problem from the problem database and by acquiring the answer of the problem and the correct/incorrect answer determination result from the student answer database, when the correct answer percentage of the problem is lower than the correct answer percentage reference value or when the percentage of the students exceeding the answer time to the answered student number exceeds the student percentage reference value;

acquiring the comment related to the comment from the teacher by displaying the comment request screen being created at a display device; and sending comment data including the comment being acquired to the respective student terminals.

3. The question setting apparatus as claimed in claim 2, wherein the comment data are sent to a student terminal of a student who incorrectly answers the problem or who has not answered the problem.

4. The question setting apparatus of claim 1, wherein when the processor executes the program, the notifying the user includes:

displaying an interface on a display device, and the interface includes the problem, the answers of the respective students, the correct/incorrect answer determination result for the respective students, and an input field to input the supplemental explanation of the problem.

5. A question setting method, performed in a computer which executes a program, the method comprising:

transmitting, by the computer through a network, a problem and a problem identifier to identify the problem to respective student terminals of the respective students connected to the question setting apparatus through the network, to thereby administer a test in which the problem is displayed by the student terminal, receiving, by the computer, respective answer data each including the problem identifier, an answer, and an answer time taken to the answer the problem, from each of a plurality of student terminals connected through a network during the test;

for each of the respective answer data, conducting, by the computer, a correct/incorrect answer determination by using a problem database and the problem identifier included in the respective answer data to identify the problem and the correct answer of the problem and comparing the correct answer of the problem the answer from each of a plurality of student terminals included in the answer data, the correct answer being acquired from a problem database which is stored in a storage part and maintains problem data including the problem, the problem identifier, the correct answer, and recording, by the computer, the answer data and a correct/incorrect answer determination result obtained by the correct/incorrect answer determination in a student answer database stored in the storage part;

determining, by the computer during the test, whether a comprehension level of students in comprehending the problem is a trigger to notify a teacher to generate a supplemental explanation of the problem, the computer configured to:

use answer data recorded in the student answer database to determine a first percentage of a number of students who answered the problem with respect to a total student number, in response to the first percentage being determined to exceed a reference answer percentage stored in the storage part, determine that the comprehension level is a trigger to notify the teacher to generate the supplemental explanation of the problem, upon the computer determining that a second percentage of a number of correct answers with respect to the number of students who answered the problem is lower than a reference correct answer percentage stored in the storage part, the second percentage determined based on the correct/incorrect answer determination results recorded in the student answer database, and in response to the first percentage being determined as not exceeding the reference answer percentage, determine that the comprehension level is a trigger to notify the teacher to generate the supplemental explanation of the problem, upon the computer determining that a third percentage of the students who exceed a reference answer time stored in the storage part is higher than a reference percentage, stored in the storage part, of students exceeding the reference answer time, the third percentage determined based on the answer times recorded in the student answer database;

in response to the computer determining that the comprehension level is a trigger to notify the teacher to generate the supplemental explanation of the problem, notifying the teacher to generate the supplemental explanation of the problem to guide the students to select a correct answer of the problem;

acquiring, by the computer, the supplemental explanation from the teacher based on the determining; and sending, by the computer, the supplemental explanation to the plurality of student terminals through the network during the test before the test ends.

6. A student terminal, comprising:
a storage part;
a processor; and
a program that is stored in the storage part and causes the processor to perform a process,
wherein when the processor executes the program, the process performs
  receiving, from a question setting apparatus connected to the student terminal through the network, problem data including a problem and a problem identifier to identify the problem, the question setting apparatus having transmitted the problem and the problem identifier to thereby administer a test in which the problem is displayed by the student terminal, being among a plurality of student terminals of respective students,
  displaying a problem included in problem data at a display device during the test, the problem data being stored in the storage part;
  when a reviewed answer is input by a student referring to the comment, sending answer data, which includes an answer input by a student for the problem being displayed, an answer time taken by the student to answer the problem, and the problem identifier, to the question setting apparatus during the test such that the answer data is stored in a student answer database of the question setting apparatus, wherein the question setting apparatus is configured to
  produce a correct/incorrect answer determination result by using the problem database and the problem identifier included in the answer data to identify the problem and the correct answer of the problem,
    record, in the student answer database, answer data including answers of respective students for the problem and the correct/incorrect answer determination result for the respective students, and
    during the test, to perform determining of a comprehension level of the students in comprehending the problem,
      use answer data recorded in the student answer database to determine a first percentage of a number of students who answered the problem with respect to a total student number,
      in response to the first percentage being determined to exceed a reference answer percentage stored in the question setting apparatus, determine that the comprehension level is a trigger to notify the teacher to generate the supplemental explanation of the problem, upon the computer determining that a second percentage of a number of correct answers with respect to the number of students who answered the problem is lower than a reference correct answer percentage stored in the question setting apparatus, the second percentage determined based on the correct/incorrect answer determination results recorded in the student answer database, and
      in response to the first percentage being determined as not exceeding the reference answer percentage, determine that the comprehension level is a trigger to notify the teacher to generate the supplemental explanation of the problem, upon the computer determining that a third percentage of the students who exceed a reference answer time stored in the question setting apparatus is higher than a reference percentage, stored in the question setting apparatus, of students exceeding the reference answer time, the third percentage determined based on the answer times recorded in the student answer database, and
      in response to determining that the comprehension level is a trigger to notify the user to generate a supplemental explanation of the problem, notify a user of the question setting apparatus to generate a supplemental explanation of the problem to guide the students to select a correct answer of the problem;
  recording the answer data in the storage part; and
  receiving from the supplemental explanation the question setting apparatus during the test, and recording the comment data in the storage part, the comment data including a comment related to the problem and based on the determining.

7. The student terminal as claimed in claim 6, wherein in the displaying the comment, the comment is displayed, regarding a problem incorrectly answered or a problem being not answered in problems included in the problem data.

* * * * *